(12) United States Patent
Ehrenberg et al.

(10) Patent No.: US 7,129,336 B2
(45) Date of Patent: Oct. 31, 2006

(54) REACTIVE AZO DYES, THEIR PREPARATION AND THEIR USE

(75) Inventors: Stefan Ehrenberg, Hattersheim (DE); Jörg Wörner, Bruchköbel (DE); Tracy Livesey, Eppelheim (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 83 days.

(21) Appl. No.: 11/032,623

(22) Filed: Jan. 10, 2005

(65) Prior Publication Data

US 2005/0159592 A1 Jul. 21, 2005

(30) Foreign Application Priority Data

Jan. 17, 2004 (DE) .................. 10 2004 002 577

(51) Int. Cl.
| | |
|---|---|
| C09B 62/008 | (2006.01) |
| C09B 62/085 | (2006.01) |
| C09B 62/245 | (2006.01) |
| C09B 62/51 | (2006.01) |
| C09B 67/24 | (2006.01) |
| C09B 67/26 | (2006.01) |
| C09D 11/02 | (2006.01) |

(52) U.S. Cl. .................. 534/638; 8/466; 8/524; 8/527; 8/528; 8/549; 106/31.48

(58) Field of Classification Search ............. 534/638; 8/466, 524, 527, 528, 549; 106/31.48
See application file for complete search history.

(56) References Cited

U.S. PATENT DOCUMENTS

| | | | |
|---|---|---|---|
| 5,760,194 A | 6/1998 | Lehmann et al. | |
| 5,789,557 A * | 8/1998 | Dornhagen et al. | 534/634 |
| 6,011,140 A | 1/2000 | Zamponi et al. | |
| 6,114,511 A * | 9/2000 | Dannheim | 534/633 |
| 6,410,698 B1 | 6/2002 | Prechtl et al. | |
| 6,815,536 B1 * | 11/2004 | Huang et al. | 534/612 |
| 6,900,294 B1 * | 5/2005 | Meier et al. | 534/638 |
| 6,930,179 B1 * | 8/2005 | Schmiedl et al. | 534/638 |
| 6,949,631 B1 * | 9/2005 | Meier et al. | 534/638 |
| 2003/0212261 A1 | 11/2003 | Meier et al. | |

FOREIGN PATENT DOCUMENTS

| | | |
|---|---|---|
| DE | 196 00 765 | 7/1997 |
| DE | 196 19 239 A1 | 11/1997 |
| DE | 198 10 906 | 9/1999 |
| EP | 0 775 730 B1 | 5/2000 |
| WO | WO-02/16504 A1 | 2/2002 |

\* cited by examiner

*Primary Examiner*—Fiona T. Powers
(74) *Attorney, Agent, or Firm*—Connolly Bove Lodge & Hutz

(57) ABSTRACT

The present invention relates to reactive dyes of the general formula (1)

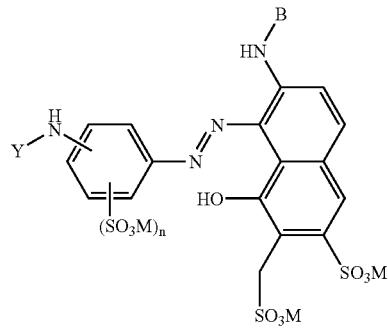

(1)

where
Y is a heterocyclic reactive group of the general formula (2) or (3)

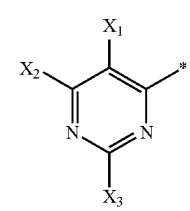

(2)

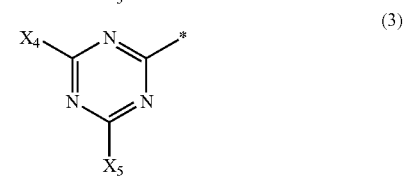

(3)

where $X_1$ to $X_5$ are each as defined in claim 1, processes for their preparation and their use for dyeing and printing hydroxyl- and/or carboxamido-containing materials.

16 Claims, No Drawings

REACTIVE AZO DYES, THEIR PREPARATION AND THEIR USE

The present invention relates to the field of fiber-reactive dyes. The documents DE 19810906 and DE 19600765 disclose dyes which share structural similarities with the hereinbelow described dyes of the present invention, but which differ with regard to the reactive system or in the identity of the coupling component. These known dyes have a number of technical disadvantages in the dyeing of textile materials. It is an object of the present invention to ameliorate these technical disadvantages.

It has now been found that, surprisingly, the hereinbelow described dyes of the general formula (1) are advantageous over the known dyes.

The present invention accordingly provides reactive dyes of the general formula (1)

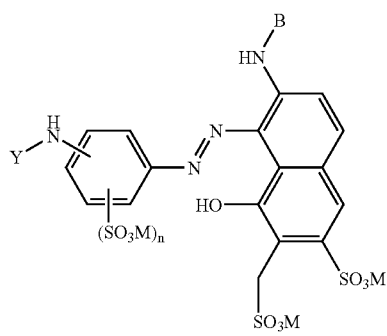

(1)

where

Y is a heterocyclic reactive group of the general formula (2) or (3)

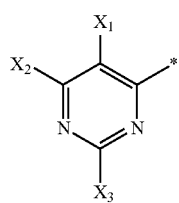

(2)

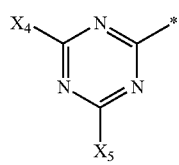

(3)

where $X_1$ to $X_3$ are independently hydrogen, cyano or halogen, with the proviso that at least one of $X_2$ and $X_3$ is halogen, $X_4$ is chlorine or fluorine, $X_5$ is a group of the general formula (4)

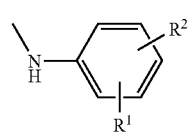

(4)

where $R^1$ is hydrogen, alkyl, alkoxy, sulfo or chlorine and $R^2$ is a radical $-SO_2CH=CH_2$ or $-SO_2CH_2CH_2Z$, where Z is a grouping which can be eliminated by the action of alkali;

n is 0, 1 or 2,

B is $-CH_2-SO_3M$ or hydrogen, and

M is hydrogen, ammonium, an alkali metal or the equivalent of an alkaline earth metal.

In the general formula (1), an alkali metal M can be in particular lithium, sodium and potassium, whereas the alkaline earth metal is calcium in particular. Preferably, M is hydrogen or sodium.

Halogen $X_1$ to $X_3$ is in particular fluorine or chlorine. $X_4$ is preferably fluorine or $X_5$.

Alkyl $R^1$ is preferably $(C_1-C_8)$-alkyl and more preferably $(C_1-C_4)$-alkyl. Examples of alkyl groups of this type are methyl, ethyl, n-propyl, i-propyl, n-butyl, i-butyl, sec-butyl and tert-butyl.

Alkoxy $R^1$ is especially methoxy or ethoxy.

Examples of Z radicals which can be eliminated by the action of alkali, ie under dyeing conditions, are chlorine, bromine, sulfato, thiosulfato, phosphate, $(C_2-C5)$-alkanoyloxy such as for example acetyloxy, benzoyloxy, sulfobenzoyloxy or p-toluylsulfonyloxy, of which sulfato is preferred.

The groups "sulfato", "thiosulfato" and "phosphato" include not only their acid form but also their salt form. Accordingly, thiosulfato groups conform to the general formula $-S-SO_3M$, phosphato groups conform to the general formula $-OPO_3M_2$ and sulfato groups conform to the general formula $-OSO_3M$, in each of which M is as defined above.

n is more preferably 1.

Preferred reactive dyes according to the present invention are those of the general formula (1a)

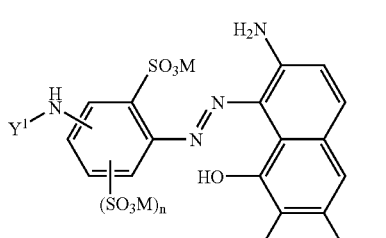

(1a)

where M is as defined above and $Y^1$ is one of the radicals (2a) to (2i)

(2a) 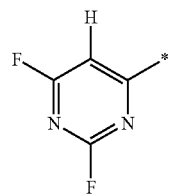
(2b) 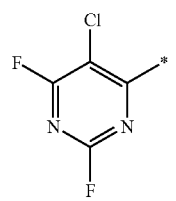
(2c) 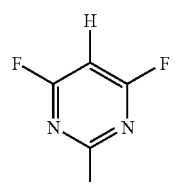
(2d) 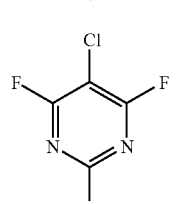
(2e) 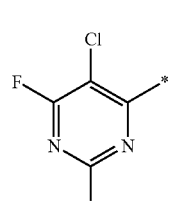
(2f) 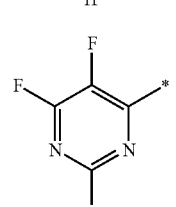
(2g) 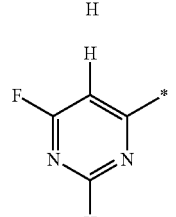
(2h) 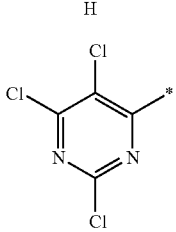
(2i) 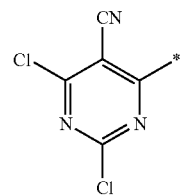
or
(3a) to (3h)
(3a) 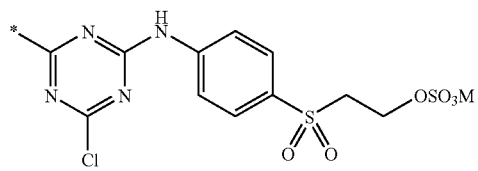
(3b) 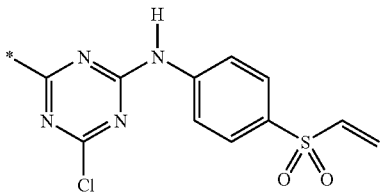
(3c) 
(3d) 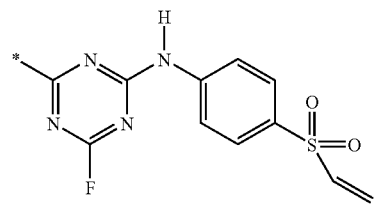
(3e) 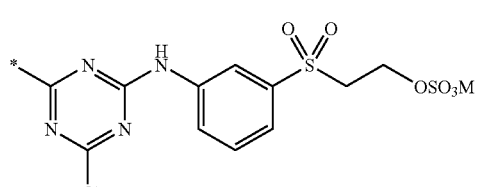
(3f) 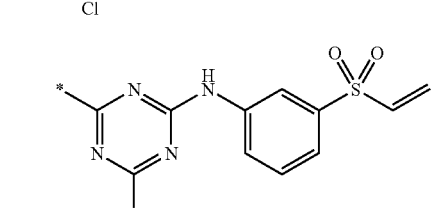
(3g)

-continued (3h)

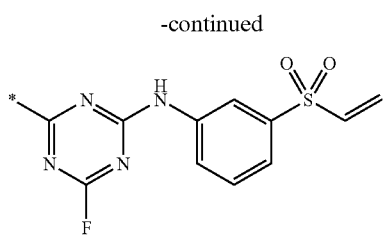

where M is as defined above.

Particular preference is given to the present invention's dyes of the formulae (1b) to (1d)

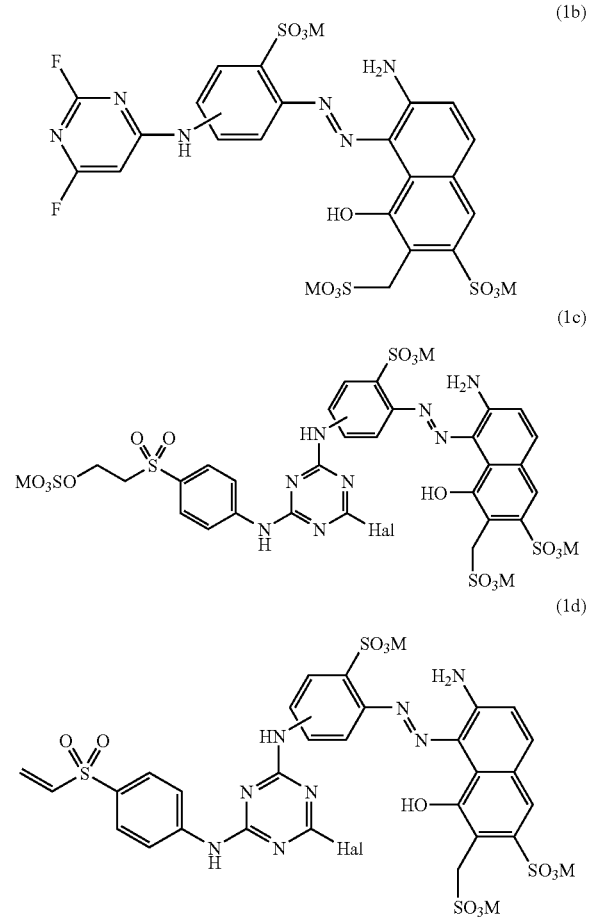

where M is as defined above.

Reactive dyes of the general formula (1) according to the present invention wherein Y is a reactive group of the general formula (2) can be present in mixtures with each other wherein the individual dyes differ in particular only in the reactive group of the general formula (2). Preferred mixtures of this type comprise for example a reactive dye of the general formula (1) where Y=(2a) and a reactive dye of the general formula (1) where Y=(2c) or a reactive dye of the general formula (1) where Y=(2b) and a reactive dye of the general formula (1) where Y=(2d).

The reactive dyes of the general formula (1) according to the invention are generally present as a preparation in solid or liquid (dissolved) form. In solid form, they generally contain the electrolyte salts customary in the case of water-soluble and especially fiber-reactive dyes, such as sodium chloride, potassium chloride and sodium sulfate, and can further contain the auxiliaries customary in commercial dyes, such as buffer substances capable of setting a pH in aqueous solution between 3 and 7, such as sodium acetate, sodium borate, sodium bicarbonate, sodium dihydrogenphosphate, sodium tricitrate and disodium hydrogenphosphate, or small amounts of siccatives or, if they are present in a liquid, aqueous solution (including the presence of thickeners of the type customary in print pastes), they may also include substances which ensure a long life for these preparations, for example mold preventatives.

The reactive dyes of the general formula (1) according to the invention are preferably present as a dye powder or as a granular dye containing 10 to 80% by weight, based on the powder or granules, of an electrolyte salt which is also known as a standardizing agent. Granules in particular have particle sizes of 50 to 500 µm. These solid preparations can further contain the aforementioned buffer substances in a total amount of up to 10% by weight, based on the preparation. When the dyes are present in aqueous solution, the total dye content in these aqueous solutions will be up to about 50% by weight, for example between 5 and 50% by weight, and the electrolyte salt content in these aqueous solutions will preferably be below 10% by weight, based on the aqueous solution. The aqueous solutions (liquid preparations) can contain the aforementioned buffer substances generally in an amount of up to 10% by weight, preferably up to 2% by weight.

Reactive dyes of the general formula (1) according to the invention wherein Y is a group of the general formula 3 may have the same chromophore but differ with regard to the fiber-reactive group $R^2$. More particularly, in the case of the same chromophore, $R^2$ can be firstly —$SO_2CH=CH_2$ and secondly —$SO_2CH_2CH_2Z$, more preferably β-sulfatoethylsulfonyl. The fraction of dye in the vinylsulfonyl form can be up to about 30 mol %, based on the respective dye chromophore. Preferably, the fraction of vinylsulfonyl dye to β-ethyl-substituted dye is in a molar ratio between 5:95 and 90:10.

The present invention further provides processes for preparing the reactive dyes of the general formula (1).

These are obtainable by reacting the compounds of the formulae (6), (7) and (2') or (6), (7), (4') and trifluorotriazine or trichlorotriazine

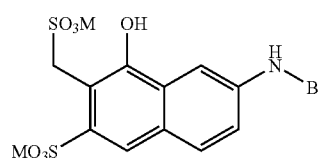

(6)

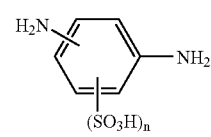

(7)

-continued

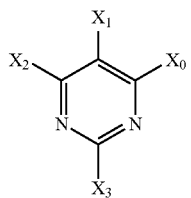
(2')

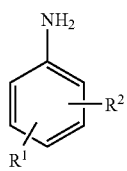
(4')

where M, n, $R^1$, $R^2$, B, $X_1$, $X_2$, $X_3$ are each as defined above and $X_0$ is fluorine or chlorine, in any order in conventional diazotization, coupling and condensation reactions.

For instance, a compound of the general formula (8)

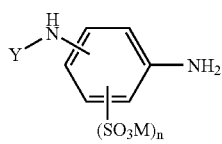
(8)

where Y, M and n are each as defined above, can be diazotized and reacted with a compound of the formula (6).

Alternatively, a compound of the general formula (9)

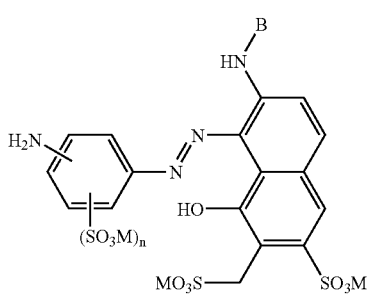
(9)

where M and n are each as defined above, can be condensed with a halopyrimidine of the general formula (2') or with a triazine of the general formula (3')

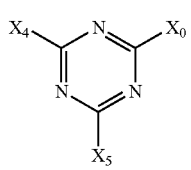
(3')

where $X_4$ and $X_5$ are each as defined above and $X_0$ is fluorine or chlorine. The compound of the general formula (3') can in turn be obtained from trifluorotriazine or trichlorotriazine and a compound of the general formula (4').

Reactive dyes of the general formula (1) according to the invention wherein Y is a group of the general formula (3) where $X_4$ is fluorine or chlorine can also be prepared by reaction of a compound of the general formula (9) with trifluorotriazine or trichlorotriazine and subsequent condensation with an amine of the general formula (4').

The compounds of the general formula (8) are obtainable in various ways. When Y is a radical of the general formula (2), they are obtained by reaction of halopyrimidines of the general formula (2') with aromatic diaminobenzenesulfonic acids, preferably 1,3-diaminobenzene-4-sulfonic acid or 1,4-diaminobenzene-2-sulfonic acid.

When Y is a radical of the general formula (3), the compounds of the general formula (8) are obtained by reacting the compounds of the general formula (3') with aromatic diaminobenzenesulfonic acids, preferably 1,3-diaminobenzene-4-sulfonic acid or 1,4-diaminobenzene-2-sulfonic acid.

The abovementioned diazotization, coupling and condensation reactions are known per se to one skilled in the art and can be carried out in the generally customary manner extensively described in the field's literature.

The dyes of the general formula (1) according to the invention are obtained as a solution or suspension in the above-described methods of making and can be isolated by salting out. They can also be spray dried; another possibility is to evaporate the solution or suspension.

The reactive dyes of the general formula (1) according to the invention possess useful application properties. They are used for dyeing and printing hydroxyl- and/or carboxamido-containing materials, for example in the form of sheetlike structures, such as paper and leather, or of films, of polyamide for example, or in bulk, as for example polyamide and polyurethane, but especially in the form of fibers of the materials mentioned. Preferably, they are used for dyeing and printing cellulosic fiber materials of any kind. They are also useful for dyeing and printing hydroxyl-containing fibers present in blend fabrics, for example blends of cotton with polyester fibers or polyamide fibers. It is also possible to use them to print textiles or paper by the inkjet process.

The present invention accordingly also provides for the use of the reactive dyes of the general formula (1) according to the invention for dyeing or printing the materials mentioned or, to be more precise, processes for dyeing or printing such materials in a conventional manner by using one or more reactive dyes of the general formula (1) according to the invention as a colorant.

Advantageously, the as-synthesized solutions of the reactive dyes of the general formula (1) according to the invention can be used directly as a liquid preparation for dyeing, if appropriate after addition of a buffer substance and similarly if appropriate after concentrating or diluting.

The materials mentioned are preferably used in the form of fiber materials, especially in the form of textile fibers, such as wovens or yarns, as in the form of hanks or wound packages.

Hydroxyl-containing materials are those of natural or synthetic origin, for example cellulose fiber materials or regenerated products thereof and polyvinyl alcohols. Cellulose fiber materials are preferably cotton, but also other vegetable fibers, such as linen, hemp, jute and ramie fibers. Regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The reactive dyes of the general formula (1) according to the invention can be applied to and fixed on the substrates mentioned, especially the fiber materials mentioned, by the application techniques known for water-soluble dyes and especially by the application techniques known for fiber-reactive dyes. Applied in this way by exhaust dyeing processes to cellulose fibers from a long liquor using a variety of acid-binding agents with or without neutral salts, such as sodium chloride or sodium sulfate, they produce dyeings having very good color yields. Preferably dyeing takes place in the exhaust process at a pH of 3 to 7, especially at a pH of 4 to 6. The liquor ratio can be chosen from within a wide range and is for example between 3:1 and 50:1, preferably between 5:1 and 30:1. They are preferably applied in an aqueous bath at temperatures between 40 and 105° C., if appropriate at a temperature of up to 130° C. under pressure, and if appropriate in the presence of customary dyeing assistants. To enhance the wetfastnesses of the dyed material, unfixed dye can be removed in an aftertreatment. This aftertreatment is effected in particular at a pH of 8 to 9 and temperatures of 75 to 80° C.

One possible procedure in this context is to introduce the material into the warm bath and to gradually heat the bath to the desired temperature and to complete the dyeing operation at that temperature. The neutral salts which speed the exhaustion of the dyes may also, if appropriate, not be added to the bath until the actual dyeing temperature has been reached.

The padding process likewise provides excellent color yields and very good color build-up on cellulose fibers, the dyes being fixable in a conventional manner by batching at room temperature or elevated temperature, for example at up to about 60° C., by steaming or using dry heat.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acidic print color and subsequent fixation either by passing the printed material through a hot electrolyte-containing alkaline bath or by overpadding with an alkaline electrolyte-containing padding liquor with subsequent batching or steaming or dry heat treatment of the alkali-overpadded material, produce strong prints having well-defined contours and a clear white ground. The outcome of the prints is substantially unaffected by variations in the fixing conditions.

When fixing by means of dry heat in accordance with the customary thermofix processes, hot air from 120 to 200° C. is used. In addition to the customary steam at 101 to 103° C., it is also possible to use superheated steam and high-pressure steam at temperatures of up to 160° C.

The acid-binding agents which effect the fixation of the dyes on the cellulose fibers include for example water-soluble basic salts of the alkali metals and likewise alkaline earth metals of inorganic or organic acids or compounds which release alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, sodium silicate or trisodium phosphate.

The reactive dyes of the general formula (1) according to the invention are notable for high reactivity, good fixability, very good build-up and also high light and perspiration-light fastness. They can therefore be used by the exhaust dyeing process at low dyeing temperatures and require only short steaming times in pad-steam processes. The degrees of fixation are high, and the unfixed portions are readily washed off, the difference between the degree of exhaustion and the degree of fixation being remarkably small, ie the hydrolysis loss being very small. They are also particularly useful for printing, especially on cotton, but also for printing nitrogenous fibers, for example wool or silk or blend fabrics containing wool or silk.

Moreover, wool which has been given a nonfelting or low-felting finish (cf. for example H. Rath, Lehrbuch der Textilchemie, Springer-Verlag, 3rd Edition (1972), p. 295–299, especially the finish by the Hercosett process (p. 298); J. Soc. Dyers and Colorists 1972, 93–99, and 1975, 33–44) can be dyed with very good fastness properties. The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with 3 times the molar amount of an aminobenzenesulfonic acid and/or of an aminonaphthalenesulfonic acid or on the basis of a reaction product of for example stearylamine with ethylene oxide. For instance, the dyes of the invention are preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the invention and the fiber. At the same time, the dye portion not reactively bound is removed.

The procedure described herein also applies to the production of dyeings on fiber materials composed of other natural polyamides or of synthetic polyamides and polyurethanes. These materials can be dyed using the customary dyeing and printing processes described in the literature and known to one skilled in the art (see for example H. K. Rouette, Handbuch der Textilveredlung, Deutscher Fachverlag GmbH, Frankfurt am Main).

The dyeing liquors and print pastes, as well as the dyes of the general formulae (1) and water, may comprise further additives. Additives are for example wetting agents, antifoam agents, leveling agents and agents which influence the properties of the textile material, such as softeners, flame retardants, soil, water and oil repellents or water-softening agents. Especially print pastes may also comprise natural or synthetic thickeners, such as for example alginates and cellulose ethers. The dye quantities can vary within wide limits in the dyebaths and print pastes depending on the desired depth of shade. The amounts of the dyes of the general formula (1) generally range from 0.01% to 15% by weight and especially from 0.1% to 10% by weight based on the material to be dyed and the print paste respectively.

The reactive dyes of the general formula (1) according to the invention are notable for the fact that, following the dyeing operation, unfixed dye portions on the fiber material are readily washed off without adjacent whites in the washing operation being tainted by the dye which becomes detached. This is advantageous for the dyeing operation in that washing cycles and hence costs are saved.

The dyeings and prints produced with the reactive dyes of the general formula (1) according to the invention, especially on cellulose fiber materials, possess high color strength and high fiber-dye bond stability not only in the acidic but also in the alkaline range as well as good lightfastness and very good wetfastness properties, such as washing, water, seawater, crossdyeing and perspiration fastnesses, and also good fastness to dry heat setting and pleating and to crocking.

The present invention further relates to the use of the abovementioned dyes of the general formula (1) in printing inks for digital textile printing by the inkjet process.

The printing inks of the present invention comprise one or more of the aforementioned reactive dyes, for example in amounts from 0.1% by weight to 50% by weight, preferably in amounts from 1% by weight to 30% by weight and more preferably in amounts from 1% by weight to 15% by weight based on the total weight of the ink. They may also include combinations of the aforementioned reactive dyes with other reactive dyes used in textile printing. For the inks to be used in the continuous flow process, a conductivity of 0.5 to 25 mS/m can be set by adding an electrolyte.

Useful electrolytes include for example lithium nitrate and potassium nitrate. The dye inks of the present invention may include organic solvents at a total level of 1–50% and preferably 5–30% by weight.

Suitable organic solvents are for example alcohols, for example methanol, ethanol, 1-propanol, isopropanol, 1-butanol, tert-butanol, pentyl alcohol, polyhydric alcohols for example: 1,2-ethanediol, 1,2,3-propanetriol, butanediol, 1,3-butanediol, 1,4-butanediol, 1,2-propanediol, 2,3-propanediol, pentanediol, 1,4-pentanediol, 1,5-pentanediol, hexanediol, D,L-1,2-hexanediol, 1,6-hexanediol, 1,2,6-hexanetriol, 1,2-octanediol, polyalkylene glycols, for example: polyethylene glycol, polypropylene glycol, alkylene glycols having 2 to 8 alkylene groups, for example monoethylene glycol, diethylene glycol, triethylene glycol, tetraethylene glycol, thioglycol, thiodiglycol, butyltriglycol, hexylene glycol, propylene glycol, dipropylene glycol, tripropylene glycol, low alkyl ethers of polyhydric alcohols, for example: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether, tripropylene glycol isopropyl ether, polyalkylene glycol ethers, such as for example: polyethylene glycol monomethyl ether, polypropylene glycol glycerol ether, polyethylene glycol tridecyl ether, polyethylene glycol nonylphenyl ether, amines, such as, for example: methylamine, ethylamine, triethylamine, diethylamine, dimethylamine, trimethylamine, dibutylamine, diethanolamine, triethanolamine, N-acetylethanolamine, N-formylethanolamine, ethylenediamine, urea derivatives, such as for example: urea, thiourea, N-methylurea, N,N'-dimethylurea, ethyleneurea, 1,1,3,3-tetramethylurea, amides, such as for example: dimethylformamide, dimethylacetamide, acetamide, ketones or keto alcohols, such as for example: acetone, diacetone alcohol, cyclic ethers, such as for example: tetrahydrofuran, trimethylolethane, trimethylolpropane, 2-butoxyethanol, benzyl alcohol, 2-butoxyethanol, gamma butyrolactone, epsilon-caprolactam, further sulfolane, dimethylsulfolane, methylsulfolane, 2,4-dimethylsulfolane, dimethyl sulfone, butadiene sulfone, dimethyl sulfoxide, dibutyl sulfoxide, N-cyclohexylpyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxymethylimidazolidine, 2-(2-methoxyethoxy)ethanol, 2-(2-ethoxyethoxy)ethanol, 2-(2-butoxyethoxy)ethanol, 2-(2-propoxyethoxy)ethanol, pyridine, piperidine, butyrolactone, trimethylpropane, 1,2-dimethoxypropane, dioxane, ethyl acetate, ethylenediaminetetraacetate, ethyl pentyl ether, 1,2-dimethoxypropane, trimethylpropane.

The printing inks of the invention may further include customary additives, for example viscosity moderators to set viscosities in the range from 1.5 to 40.0 mPas in a temperature range from 20 to 50° C. Preferred inks have a viscosity of 1.5 to 20 mPas and particularly preferred inks have a viscosity of 1.5 to 15 mPas.

Useful viscosity moderators include rheological additives, for example: polyvinylcaprolactam, polyvinylpyrrolidone and their copolymers polyetherpolyol, associative thickeners, polyurea, polyurethane, sodium alginates, modified galactomannans, polyetherurea, polyurethane, nonionic cellulose ethers.

As further additives the inks of the invention may include surface-active substances to set surface tensions of 20 to 65 mN/m, which are adapted if necessary as a function of the process used (thermal or piezo technology).

Useful surface-active substances include for example: all surfactants, preferably nonionic surfactants, butyldiglycol, 1,2-hexanediol.

The inks may further include customary additives, for example substances to inhibit fungal and bacterial growth in amounts from 0.01 to 1% by weight based on the total weight of the ink.

The inks may be prepared in a conventional manner by mixing the components in water. The dye inks of the invention are useful in inkjet printing processes for printing a wide variety of pretreated materials, such as silk, leather, wool, polyamide fibers and polyurethanes, and especially cellulosic fiber materials of any kind. Such fiber materials are for example the natural cellulose fibers, such as cotton, linen and hemp, and also pulp and regenerated cellulose. The printing inks of the invention are also useful for printing pretreated hydroxyl- or amino-containing fibers present in blend fabrics, for example blends of cotton, silk, wool with polyester fibers or polyamide fibers.

In contrast to conventional textile printing, where the printing ink already contains all the fixing chemicals and thickeners for a reactive dye, in inkjet printing the auxiliaries have to be applied to the textile substrate in a separate pretreatment step.

The pretreatment of the textile substrate, for example cellulose and regenerated cellulose fibers and also silk and wool, is effected with an aqueous alkaline liquor prior to printing. To fix reactive dyes there is a need for alkali, for example sodium carbonate, sodium bicarbonate, sodium acetate, trisodium phosphate, sodium silicate, sodium hydroxide, alkali donors such as, for example, sodium chloroacetate, sodium formate, hydrotropic substances such as, for example, urea, reduction inhibitors, for example sodium nitrobenzenesulfonates, and also thickeners to prevent flowing of the motives when the printing ink is applied, for example sodium alginates, modified polyacrylates or highly etherified galactomannans.

These pretreatment reagents are uniformly applied to the textile substrate in a defined amount using suitable applicators, for example using a 2- or 3-roll pad, contactless spraying technologies, by means of foam application or using appropriately adapted inkjet technologies, and subsequently dried.

After printing, the textile fiber material is dried at 120 to 150° C. and subsequently fixed.

The fixing of the inkjet prints prepared with reactive dyes may be effected at room temperature or with saturated steam, with superheated steam, with hot air, with microwaves, with infrared radiation, with laser or electron beams or with other suitable energy transfer techniques.

A distinction is made between one- and two-phase fixing processes:

In one-phase fixing, the necessary fixing chemicals are already on the textile substrate.

In two-phase fixing, this pretreatment is unnecessary. Fixing only requires alkali, which, following inkjet printing, is applied prior to the fixing process, without intermediate drying. There is no need for further additives such as urea or thickener. Fixing is followed by the print aftertreatment, which is the prerequisite for good fastnesses, high brilliance and an impeccable white ground.

The prints produced with the dye inks of the present invention, especially on cellulose fiber materials, possess high color strength and high fiber-dye bond stability not only in the acidic but also in the alkaline range as well as good lightfastness and very good wetfastness properties, such as washing, water, seawater, crossdyeing and perspiration fastnesses, and also good fastness to dry heat setting and pleating and to crocking.

The examples hereinbelow serve to illustrate the invention. Parts and percentages are by weight, unless otherwise stated. Parts by weight relate to parts by volume as the kilogram relates to the liter.

The compounds described in the examples in terms of formulae are indicated in the form of free acid. But generally they are prepared and isolated in the form of their alkali metal salts, such as lithium, sodium or potassium salts, and used for dyeing in the form of their salts. Similarly, the starting compounds and components indicated in the form of free acid in the subsequent examples, especially table examples, can be used in the synthesis as such or in the form of their salts, preferably alkali metal salts.

The absorption maxima ($\lambda_{max}$) in the visible range reported for the dyes according to the invention were determined in aqueous solutions of their alkali metal salts.

EXAMPLE 1

18.8 parts of 1,3-diaminobenzene-4-sulfonic acid are suspended in 150 parts of water and dissolved by addition of lithium hydroxide solution under neutral conditions. The solution is cooled down to 10° C. and is admixed with 17.4 parts of 2,4,6-trifluoropyrimidine added dropwise over an hour, and a pH of 5.5 is obtained with 15% sodium carbonate solution. On completion of the addition the batch is allowed to warm to 20° to 25° C. and is subsequently stirred for an hour. It is then filtered and admixed with 6.9 parts of sodium nitrate.

The filtrate is cooled down to 10° C. by chucking in ice and added dropwise over 30 minutes to an initial charge of 100 parts of ice and 60 parts of concentrated hydrochloric acid (31%). After stirring for 1 hour, excess nitrite is destroyed by addition of sulfamic acid.

A neutral solution of 33.3 parts of 6-amino-4-hydroxy-3-hydroxysulfomethyl-naphthalene-2 sulfonic acid is in 300 parts of water is added dropwise over 30 minutes to the cold diazotization batch at 10° C.

Sodium carbonate solution is used to adjust to pH 6 before stirring for 1 hour. The temperature rises to 20° C. This is followed by buffering with $NaH_2PO_4/Na_2HPO_4$. The solution obtained is evaporated to leave a dye of the formula

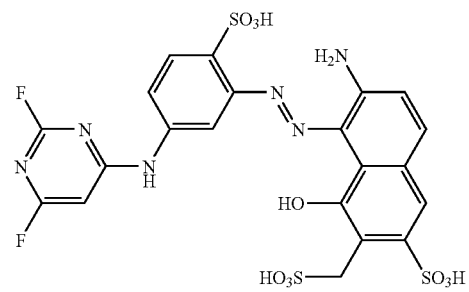

$\lambda_{max} = 520$ nm

The dye dyes and prints cotton in neutral red shades having good fastnesses, especially high lightfastness.

The dyes of the following Examples 2 to 26 were obtained in a similar manner. To this end, the pyrimidine compound was reacted with the condensation component, diazotized and coupled onto the compound of the formula (6a).

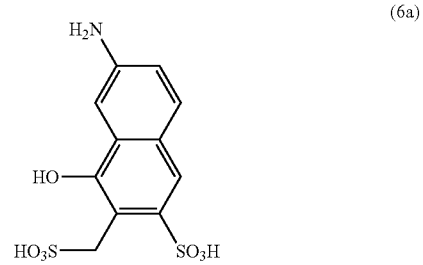

(6a)

| Ex. | Pyrimidine | Condensation component | Hue | $\lambda_{max}$ |
|---|---|---|---|---|
| 2 | 5-chloro-2,4,6-trifluoropyrimidine | 1,3-diaminobenzene-4-sulfonic acid | red | 521 |
| 3 | 4,5,6-trifluoropyrimidine | 1,3-diaminobenzene-4-sulfonic acid | rot | 520 |
| 4 | 5-chloro-4,6-difluoropyrimidine | 1,3-diaminobenzene-4-sulfonic acid | red | 520 |

-continued

| Ex. | Pyrimidine | Condensation component | Hue | $\lambda_{max}$ |
|---|---|---|---|---|
| 5 | 4,6-difluoropyrimidine | 1,3-diaminobenzene-4-sulfonic acid | red | 521 |
| 6 | 2,4,5,6-tetrachloropyrimidine | 1,3-diaminobenzene-4-sulfonic acid | red | 520 |
| 7 | 5-cyano-2,4,6-trichloropyrimidine | 1,3-diaminobenzene-4-sulfonic acid | red | 520 |
| 8 | 5-chloro-2,4,6-trifluoropyrimidine | 1,4-diaminobenzene-2-sulfonic acid | red | 526 |
| 9 | 4,5,6-trifluoropyrimidine | 1,4-diaminobenzene-2-sulfonic acid | red | 525 |
| 10 | 5-chloro-4,6-difluoropyrimidine | 1,4-diaminobenzene-2-sulfonic acid | red | 526 |
| 11 | 4,6-difluoropyrimidine | 1,4-diaminobenzene-2-sulfonic acid | red | 526 |
| 12 | 2,4,5,6-tetrachloropyrimidine | 1,4-diaminobenzene-2-sulfonic acid | red | 525 |
| 13 | 5-cyano-2,4,6-trichloropyrimidine | 1,4-diaminobenzene-2-sulfonic acid | red | 527 |
| 14 | 2,4,6-trifluoropyrimidine | 1,4-diaminobenzene-2-sulfonic acid | red | 527 |
| 15 | 5-chloro-2,4,6-trifluoropyrimidine | 1,3-diaminobenzene-4,6-disulfonic acid | red | 521 |
| 16 | 4,5,6-trifluoropyrimidine | 1,3-diaminobenzene-4,6-disulfonic acid | red | 521 |
| 17 | 5-chloro-4,6-difluoropyrimidine | 1,3-diaminobenzene-4,6-disulfonic acid | red | 520 |
| 18 | 2,4,6-trifluoropyrimidine | 1,3-diaminobenzene-4,6-disulfonic acid | red | 521 |
| 19 | 2,4,5,6-tetrachloropyrimidine | 1,3-diaminobenzene-4,6-disulfonic acid | red | 521 |
| 20 | 5-cyano-2,4,6-trichloropyrimidine | 1,3-diaminobenzene-4,6-disulfonic acid | red | 521 |
| 21 | 5-chloro-2,4,6-trifluoropyrimidine | 1,4-diaminobenzene-2,5-disulfonic acid | red | 525 |
| 22 | 4,5,6-trifluoropyrimidine | 1,4-diaminobenzene-2,5-disulfonic acid | red | 525 |
| 23 | 5-chloro-4,6-difluoropyrimidine | 1,4-diaminobenzene-2,5-disulfonic acid | red | 526 |
| 24 | 2,4,6-trifluoropyrimidine | 1,4-diaminobenzene-2,5-disulfonic acid | red | 526 |
| 25 | 2,4,5,6-tetrachloropyrimidine | 1,4-diaminobenzene-2,5-disulfonic acid | red | 526 |
| 26 | 5-cyano-2,4,6-trichloropyrimidine | 1,4-diaminobenzene-2,5-disulfonic acid | red | 525 |

EXAMPLE 27

21.8 parts of 4-nitroaniline-2-sulfonic acid are suspended in 400 parts of water and neutralized with aqueous sodium hydroxide solution. 6.9 parts of sodium nitrite are added, and the suspension is stirred until everything has dissolved.

The solution is added dropwise at 0–5° C. to initially charged 0 parts of ice and 30 parts of hydrochloric acid (31%) followed by stirring for 60 minutes. Excess nitrite is removed by addition of sulfamic acid.

A solution of 33.3 parts of 6-amino-4-hydroxy-3-hydroxysulfonylmethylnaph-thalene-2-sulfonic acid in 300 parts of water is cooled to 10° C. This solution is added to the diazonium salt solution and the pH is adjusted to 6.0 by adding sodium carbonate solution.

This affords a dye solution which in the form of the free acid contains a compound of the formula (10)

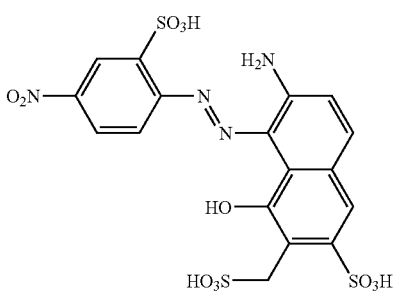

The solution of the compound (10) is adjusted to pH 8.5 with aqueous sodium hydroxide solution and heated to 35–40° C. A solution of 5.6 parts of NaHS in 50 parts of water is added dropwise and the pH is kept constant at 8.5 by the addition of hydrochloric acid.

The compound obtained is precipitated by addition of 150 parts of sodium chloride, filtered off and washed with aqueous sodium chloride solution. The compound obtained conforms in the form of its free acid to the formula (9a)

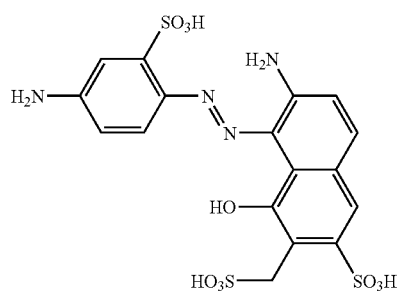

(9a)

53.2 parts of compound (9a) are dissolved in 500 parts of water. The solution is cooled to 15° C. and at this temperature 13.4 parts of 2,4,6-trifluoropyrimidine are added dropwise over an hour. During this addition the pH is held at 6.5 by adding aqueous sodium carbonate solution. Addition is followed by a further hour's stirring at 30 to 35° C. The end point of the reaction is determined by thin layer chromatography. The dye of Example 14 is precipitated as an isomer mixture by addition of sodium chloride, filtered off and dried.

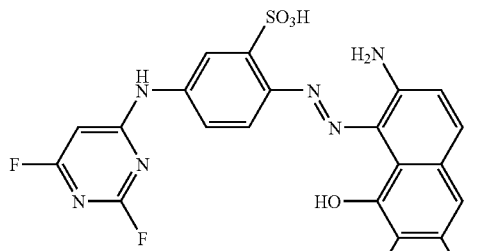

$\lambda_{max} = 527$ nm

The dye dyes cotton in a bluish red shade.

The compounds of the formulae of Examples 8 to 13 are preparable in a similar manner by condensing compound (9a) with appropriate pyrimidine derivatives.

EXAMPLE 28

28.1 parts of 4-(2'-sulfatoethylsulfonyl)aniline are dissolved in 250 parts of water by neutralization with solid sodium bicarbonate. The solution is admixed with 4.2 parts of sodium fluoride and subsequently cooled down to 0° to 5° C. by addition of ice. 13.5 parts of trifluorotriazine are then added dropwise within 5 minutes, the pH initially dropping off rapidly and subsequently settling down at 4.5 to 5.0. On completion of the addition the batch is stirred for a further 15 minutes. Then a solution of 53.2 parts of the compound of the formula (9a) in 500 ml of water is added dropwise and the pH is adjusted to 6.0 to 6.5. To complete the reaction the batch is warmed to 30° to 35° C. and subsequently stirred for 60 minutes. The dye is precipitated by addition of sodium chloride, filtered off with suction and dried to leave a dark red dye powder whose structure conforms to the formula

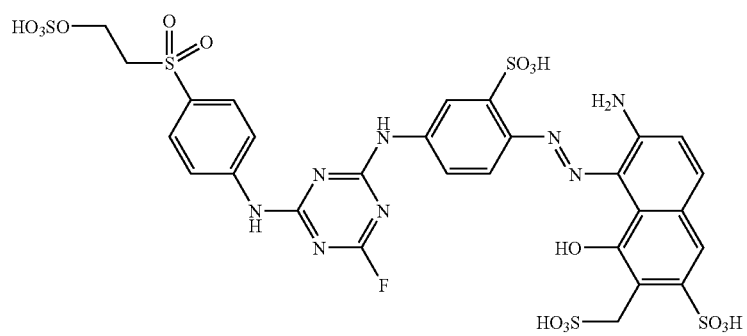

$\lambda_{max} = 522$ nm

The dye dyes cotton in bluish red shades having good fastnesses, especially high lightfastness.

The Examples 29 to 35 indicated in the table which follows are obtained in a similar manner by first reacting the amine of the general formula (4') with trifluorotriazine or trichlorotriazine and then condensing with the compound of the formula (9).

of sodium fluoride and subsequently cooled down to 0° to 5° C. by addition of ice. 13.5 parts of trifluorotriazine are then added dropwise within 5 minutes, the pH initially dropping off rapidly and subsequently settling down at 4.5 to 5.0. On completion of the addition the batch is stirred for a further 15 minutes. Then a neutralized solution of 18.8 parts of 1,3-diaminobenzene-4-sulfonic acid in water is added drop-

| Ex. | Amine of formula (4') | Halotriazine | Condensation component of formula (9) | Hue | $\lambda_{max}$ |
|---|---|---|---|---|---|
| 29 | [HO3SOCH2CH2SO2-phenyl(OMe)-NH2] | trifluorotriazine | [H2N-phenyl(SO3H)-N=N-naphthyl(NH2)(OH)(CH2SO3H)(SO3H)] | red | 523 |
| 30 | [3-(HO3SOCH2CH2SO2)aniline] | " | " | red | 523 |
| 31 | [4-(HO3SOCH2CH2SO2)aniline] | trichlorotriazine | " | red | 522 |
| 32 | [3-(HO3SOCH2CH2SO2)aniline] | " | " | red | 523 |
| 33 | " | " | [H2N-phenyl-N=N-naphthyl(NH2)(OH)(CH2SO3H)(SO3H)] | red | 524 |
| 34 | [4-(HO3SOCH2CH2SO2)aniline] | " | " | red | 523 |

EXAMPLE 35

28.1 parts of 4-(2'-sulfatoethylsulfonyl)aniline are dissolved in 250 parts of water by neutralization with solid sodium bicarbonate. The solution is admixed with 4.2 parts wise and the pH is adjusted to 6.0 to 6.5. To complete the reaction the batch is warmed to 30° to 35° C. and subsequently stirred for 60 minutes. The solution obtained is filtered and admixed with 6.9 parts of sodium nitrite. The solution obtained is cooled down to 10° C. by chucking in ice and added dropwise over 30 minutes to an initial charge of 100 parts of ice on 60 parts of concentrated hydrochloric acid (31%). The batch is subsequently stirred before excess nitrite is destroyed by addition of sulfamic acid.

33.3 parts of 6-amino-4-hydroxy-3-hydroxysulfonylm-ethylnaphthalene-2-sulfonic acid are added to the cold diazotization batch at 10° C. The reaction mixture is adjusted to pH 6.0 with sodium carbonate solution. After the reaction has ended $NaH_2PO_4/Na_2HPO_4$ buffer is added. The solution obtained is evaporated to leave a red dye powder whose structure conforms to the formula The dye dyes cotton in strongly bluish red shades having good fastnesses, especially high lightfastness.

The Examples 36 to 45 indicated in the table which follows are obtained in a similar manner by first reacting the amine of the formula (4') with trifluorotriazine and then condensing with 1,3-diaminobenzene-4-sulfonic acid or 1,4-diaminobenzene-2-sulfonic acid. The dyes described are obtained after diazotization and coupling onto the compound of the formula (6).

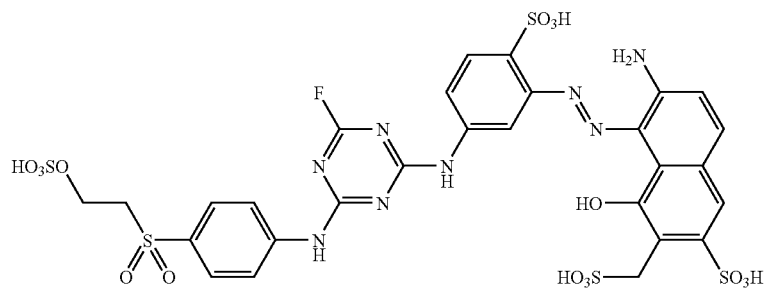

$\lambda_{max}$ = 523 nm

30

| Ex. | Amine of formula (4') | Halotriazine | Condensation component | Hue | $\lambda_{max}$ |
|---|---|---|---|---|---|
| 36 | ![OMe, NH2, HO3SO-CH2CH2-SO2-phenyl] | ![trifluorotriazine F,F,F] | ![SO3H, NH2, H2N-phenyl] | red | 521 |
| 37 | ![NH2-phenyl-SO2-CH2CH2-OSO3H] | " | " | red | 523 |
| 38 | ![NH2-phenyl-SO2-CH=CH2] | ![trichlorotriazine Cl,Cl,Cl] | " | red | 522 |
| 39 | ![NH2-phenyl-SO2-CH2CH2-OSO3H] | " | " | red | 523 |

-continued

| Ex. | Amine of formula (4') | Halotriazine | Condensation component | Hue | $\lambda_{max}$ |
|---|---|---|---|---|---|
| 40 | HO₃SO-CH₂CH₂-SO₂-C₆H₄-NH₂ (para) | 2,4,6-trifluoro-1,3,5-triazine | 1,3-diamino-4,6-disulfo benzene | red | 521 |
| 41 | " | " | " | red | 528 |
| 42 | 3-(β-sulfatoethylsulfonyl)aniline | " | 2,4-diamino benzenesulfonic acid | red | 522 |
| 43 | HO₃SO-CH₂CH₂-SO₂-C₆H₄-NH₂ (para) | cyanuric chloride | " | red | 522 |
| 44 | 4-(vinylsulfonyl)aniline | " | " | red | 521 |
| 45 | 3-(β-sulfatoethylsulfonyl)aniline | " | " | red | 523 |

EXAMPLE 46

A solution of 28.1 parts of 4-(β-sulfatoethylsulfonyl) aniline in 80 parts of water having a pH of 4–4.5 is added over 30 minutes to a suspension of 18.8 parts of cyanurate chloride in 100 parts of water and 100 parts of ice. The acylation is conducted at a temperature of 10–13° C. and a pH of 4.1–4.2. After the reaction has ended, a solution of 53.2 parts of the compounds of the formula (9a) in 500 parts of water is added to the acylation mixture. The pH is maintained at 5.5 with sodium carbonate solution. The batch is subsequently stirred at a pH of 5.5.

After the reaction has ended, the pH is raised to and maintained at 11 with aqueous sodium hydroxide solution. After the vinylization has ended, the pH is adjusted to 6.0 with dilute sulfuric acid. The dye solution is dried to leave a dark red powder whose structure conforms to the formula

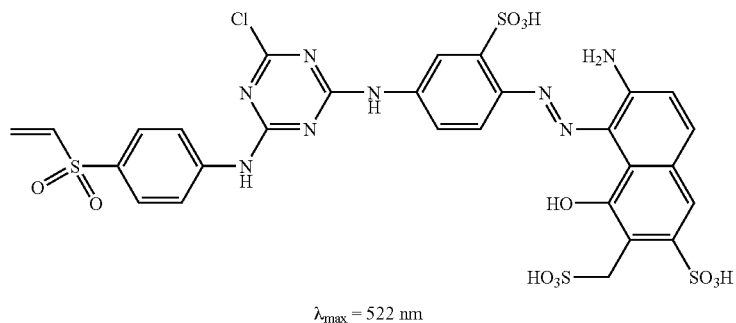
λ_max = 522 nm
It dyes polyamide in a red shade having very good fastnesses, especially high lightfastness.
The examples indicated in the table which follows are obtained in a similar manner:

-continued

| Ex. | Amine of formula (4') | Halotriazine | Condensation component of formula (9) | Hue | $\lambda_{max}$ |
|---|---|---|---|---|---|
| 51 | " | " | [structure: aminobenzene-SO₃H azo-coupled to aminonaphthol disulfonic acid] | red | 521 |
| 52 | [structure: 3-aminophenyl vinyl sulfone] | " | " | red | 522 |
| 53 | [structure: 4-aminophenyl vinyl sulfone] | [cyanuric chloride] | [structure: H₂N-phenyl-N=N-naphthol with HN-CH₂-SO₃H substituent] | red | 540 |
| 54 | " | " | [structure: aminobenzenesulfonic acid azo-coupled to naphthol with HN-CH₂-SO₃H substituent] | red | 541 |

Dyeing Example 1

1 part of the dye of Preparation Example 1 are dissolved in 2000 parts of water and 5 parts of sodium sulfate, 1 part of the leveling assistant (based on a condensation product of a higher aliphatic amine and ethylene oxide) and also 5 parts of sodium acetate are added.

The pH is then adjusted to 4.5 with acetic acid (80%). The dyebath is heated to 50° C. for 10 minutes and is then entered with 100 parts of a woven wool fabric. The temperature is raised to 100° C. in the course of 50 minutes and dyeing is carried out at 100° C. for 60 minutes. This is followed by cooling down to 90° C. and removal of the dyed material. The wool fabric is washed with hot and cold water, subsequently whizzed and dried. The red dyeing obtained has good light and wetfastnesses and also good levelness in the fiber.

Dyeing Example 2

1 part of the dye of Preparation Example 1 are dissolved in 2000 parts of water and 1 part of the leveling assistant (based on a condensation product of a higher aliphatic amine and ethylene oxide) and also 5 parts of sodium acetate are added. The pH is then adjusted to 5 with acetic acid (80%). The dyebath is heated to 50° C. for 10 minutes and is then entered with 100 parts of a woven polyamide fabric. The temperature is raised to 110° C. in the course of 50 minutes and dyeing is carried out at 110° C. for 60 minutes. This is followed by cooling down to 60° C. and removal of the dyed material. The nylon fabric is washed with hot and cold water, soaped off and subsequently whizzed and dried. The red dyeing obtained has good light and wetfastnesses and also good levelness in the fiber.

Dyeing Example 3

2 parts of the dye obtained as per Example 1 and 50 parts of sodium chloride are dissolved in 999 parts of water and parts 5 of sodium carbonate, 0.7 part of sodium hydroxide (in the form of a 32.5% aqueous solution) and, if appropriate, 1 part of a wetting agent are added. This dyebath is entered with 100 g of a woven cotton fabric. The temperature of the dyebath is initially maintained at 25° C. for 10 minutes, then raised to the final temperature (40–80° C.) over 30 minutes and maintained at the final temperature for a further 60–90 minutes. Thereafter, the dyed fabric is initially rinsed with tap water for 2 minutes and then with deionized water for 5 minutes. The dyed fabric is neutralized at 40° C. in 1000 parts of an aqueous solution which contains 1 part of 50% acetic acid for 10 minutes. It is rinsed again with deionized water at 70° C. and then soaped off at the boil with a laundry detergent for 15 minutes, rinsed once more and dried to provide a strong red dyeing having very good fastness properties.

Dyeing Example 4

A textile fabric consisting of mercerized cotton is padded with a liquor containing 35 g/l of anhydrous sodium carbonate, 100 g/l of urea and 150 g/l of a low viscosity sodium alginate solution (6%) and dried. The wet pickup is 70%. The thus pretreated textile is printed with an aqueous ink containing
2% of the dye of Example 1
20% of sulfolane
0.01% of Mergal K9N
77.99% of water using a drop-on-demand (bubble jet) inkjet print head. The print is fully dried. It is fixed by means of saturated steam at 102° C. for 8 minutes. The print is then rinsed warm, subjected to a fastness wash with hot water at 95° C., rinsed warm and then dried. The result is a bluish red print having excellent wearing fastnesses.

Dyeing Example 5

A textile fabric consisting of mercerized cotton is padded with a liquor containing 35 g/l of anhydrous sodium carbonate, 50 g/l of urea and 150 g/l of a low viscosity sodium alginate solution (6%) and dried. The wet pickup is 70%. The thus pretreated textile is printed with an aqueous ink containing
8% of the dye of Example 1
20% of 1,2-propanediol
0.01% of Mergal K9N and
71.99% of water using a drop-on-demand (bubble jet) inkjet print head. The print is fully dried. It is fixed by means of saturated steam at 102° C. for 8 minutes.

The print is then rinsed warm, subjected to a fastness wash with hot water at 95° C., rinsed warm and then dried. The result is a bluish red print having excellent wearing fastnesses.

Dyeing Example 6

A textile fabric consisting of mercerized cotton is padded with a liquor containing 35 g/l of anhydrous sodium carbonate, 100 g/l of urea and 150 g/l of a low viscosity sodium alginate solution (6%) and dried. The wet pickup is 70%. The thus pretreated textile is printed with an aqueous ink containing
8% of the dye of Example 1
15% of N-methylpyrrolidone
0.01% of Mergal K9N and
77.99% of water using a drop-on-demand (bubble jet) inkjet print head. The print is fully-dried. It is fixed by means of saturated steam at 102° C. for 8 minutes. The print is then rinsed warm, subjected to a fastness wash with hot water at 95° C., rinsed warm and then dried. The result is a bluish red print having excellent wearing fastnesses.

The invention claimed is:

1. Reactive dyes of the general formula (1)

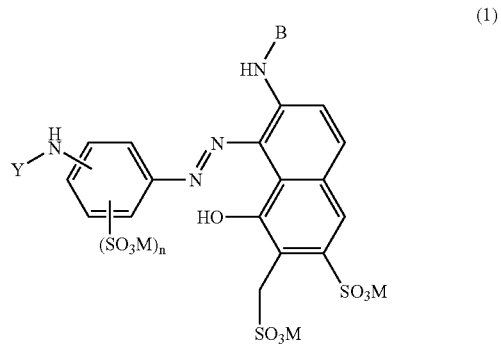

where
Y is a heterocyclic reactive group of the general formula (2) or (3)

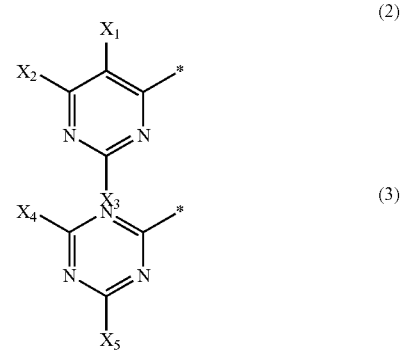

where
$X_1$ to $X_3$ are independently hydrogen, cyano or halogen, with the proviso that at least one of $X_2$ and $X_3$ is halogen,
$X_4$ is chlorine or fluorine,
$X_5$ is a group of the general formula (4)

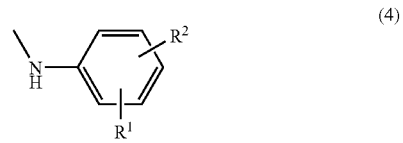

where
$R^1$ is hydrogen, alkyl, alkoxy, sulfo or chlorine and
$R^2$ is a radical —$SO_2CH=CH_2$ or —$SO_2CH_2CH_2Z$, where Z is a grouping which can be eliminated by the action of alkali;
n is 0, 1 or 2,
B is —$CH_2$—$SO_3M$ or hydrogen, and M is hydrogen, ammonium, an alkali metal or the equivalent of an alkaline earth metal.

2. A reactive dye according to claim 1 wherein n is 0.

3. A reactive dye according to claim 1 wherein

Y is a heterocyclic reactive group of the general formula (3), $R^1$ is hydrogen or $(C_1-C_4)$-alkyl and B is hydrogen.

4. A reactive dye according to claim 1 that has the general formula (1a)

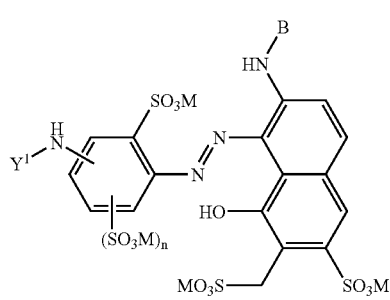

(1a)

where

M is hydrogen, ammonium, an alkali metal or the equivalent of an alkaline earth metal and $Y^1$ is one of the radicals (2a) to (2i)

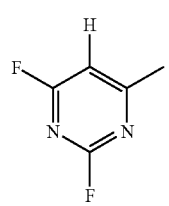

(2a)

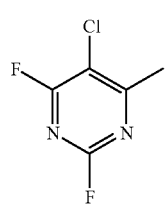

(2b)

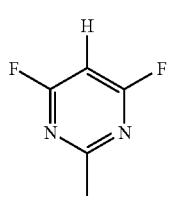

(2c)

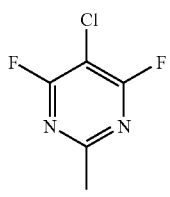

(2d)

-continued

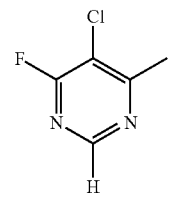

(2e)

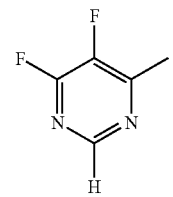

(2f)

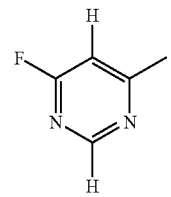

(2g)

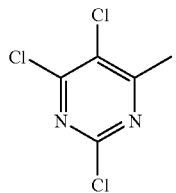

(2h)

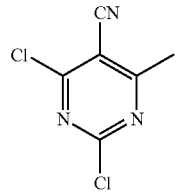

(2i)

where B is $-CH_2-SO_3M$ or hydrogen.

5. A reactive dye according to claim 1 that has the general formula (1b)

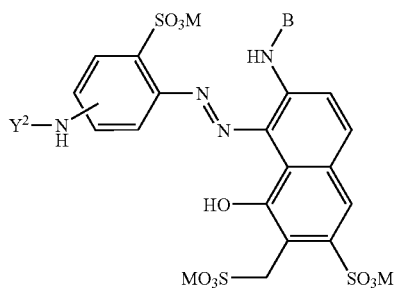

(1b)

where M is hydrogen, ammonium, an alkali metal or the equivalent of an alkaline earth metal and $Y^2$ is one of the radicals (3a) to (3h):

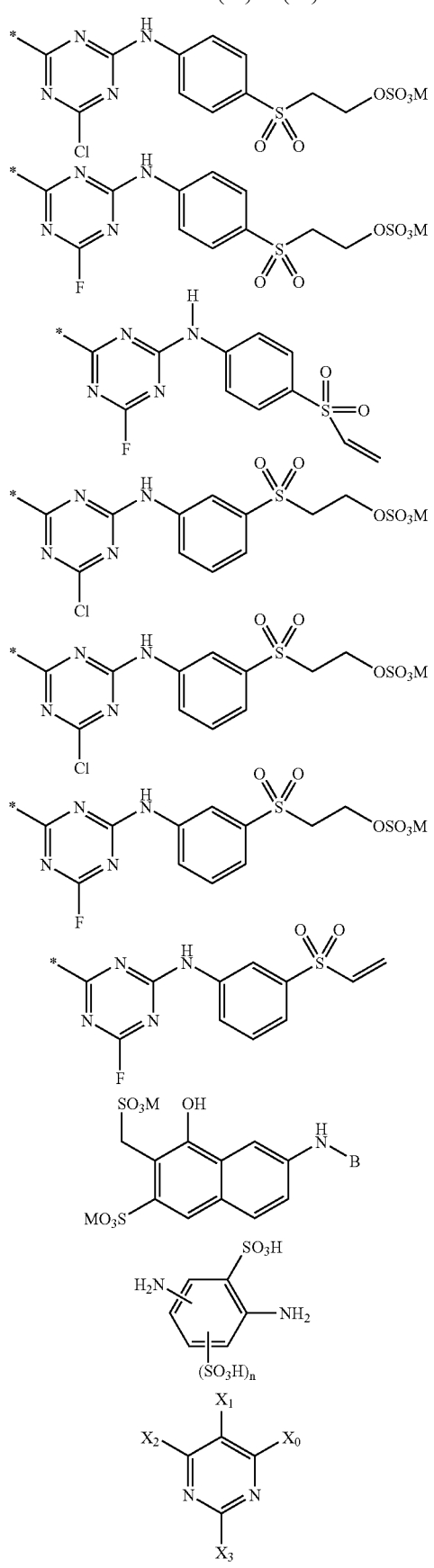

B is —CH$_2$—SO$_3$M or hydrogen and
M is defined above.

6. A reactive dye according to claim 1 wherein B is hydrogen.

7. A process for preparing a reactive dye according to claim 1, which comprises constructing said reactive dye by reacting the compounds of the formulae (6), (7) and (2') or (6), (7), (4') and trifluorotriazine or trichlorotriazine

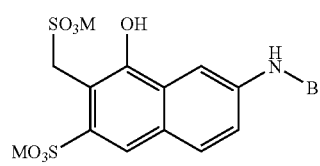

(6)

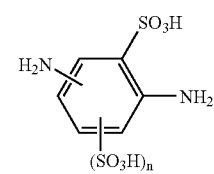

(7)

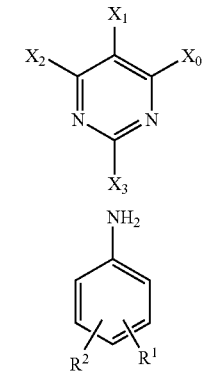

(2')

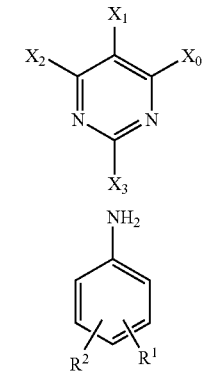

(4')

where
$X_1$ to $X_3$ are independently hydrogen, cyano or halogen, with the proviso that at least one of $X_2$ and $X_3$ is halogen,
$X_4$ is chlorine or fluorine,
$X_5$ is a group of the general formula (4)

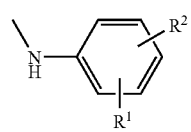

(4)

$R^1$ is hydrogen, alkyl, alkoxy, sulfo or chlorine,
$R^2$ is a radical —SO$_2$CH=CH$_2$ or —SO$_2$CH$_2$CH$_2$Z, where Z is a grouping which can be eliminated by the action of alkali;
n is 0, 1 or 2,
B is —CH$_2$—SO$_3$M or hydrogen, and M is hydrogen, ammonium, an alkali metal or the equivalent of an alkaline earth metal;
and $X_0$ is fluorine or chlorine, in any order in diazotization, coupling and condensation reactions.

8. The process according to claim 7 wherein a compound of the general formula (8)

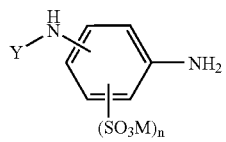

(8)

is diazotized and reacted with a compound of the formula (6)

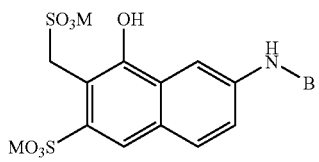

(6)

where
B is —$CH_2$—$SO_3M$ or hydrogen, and
M is hydrogen, ammonium, an alkali metal or the equivalent of an alkaline earth metal.

9. The process according to claim 7 wherein a compound of the general formula (9)

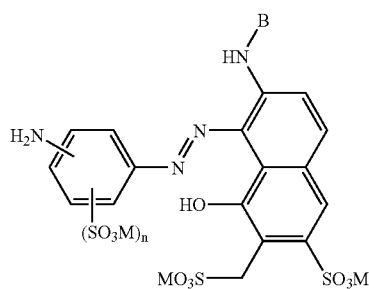

(9)

where
B is —$CH_2$—$SO_3M$ or hydrogen,
n is 0, 1 or 2, and
M is hydrogen, ammonium, an alkali metal or the equivalent of an alkaline earth metal;

is condensed with a halopyrimidine of the general formula (2') or with a triazine of the general formula (3')

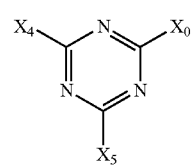

(3')

where
$X_4$ is chlorine or fluorine,
$X_5$ is a group of the general formula (4)

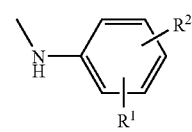

(4)

where
$R^1$ is hydrogen, alkyl, alkoxy, sulfo or chlorine and
$R^2$ is a radical —$SO_2CH$=$CH_2$ or —$SO_2CH_2CH_2Z$, where Z is a group)ing which can be eliminated by the action of alkali;
and $X_0$ is fluorine or chlorine.

10. Dye preparations comprising one or more reactive dyes according to claim 1 for dyeing and printing hydroxyl- and/or carboxamido-containing material.

11. Aqueous printing inks for textile printing by the inkjet process, comprising one or more reactive dyes from claim 1 in amounts from 0.01% by weight to 40% by weight based on the total weight of the inks.

12. A process for dyeing, conventional printing and also inkjet printing of textile fiber materials, which comprises utilizing one or more reactive dyes from claim 1.

13. A reactive dye according to claim 2, wherein
Y is a heterocyclic reactive group of the general formula (3),
$R^1$ is hydrogen or $(C_1-C_4)$-alkyl and B is hydrogen.

14. A reactive dye according to claim 4, wherein B is hydrogen.

15. A reactive dye according to claim 5, wherein B is hydrogen.

16. Dye preparations according to claim 10, wherein said material is a fiber material.

* * * * *